Figure 1:
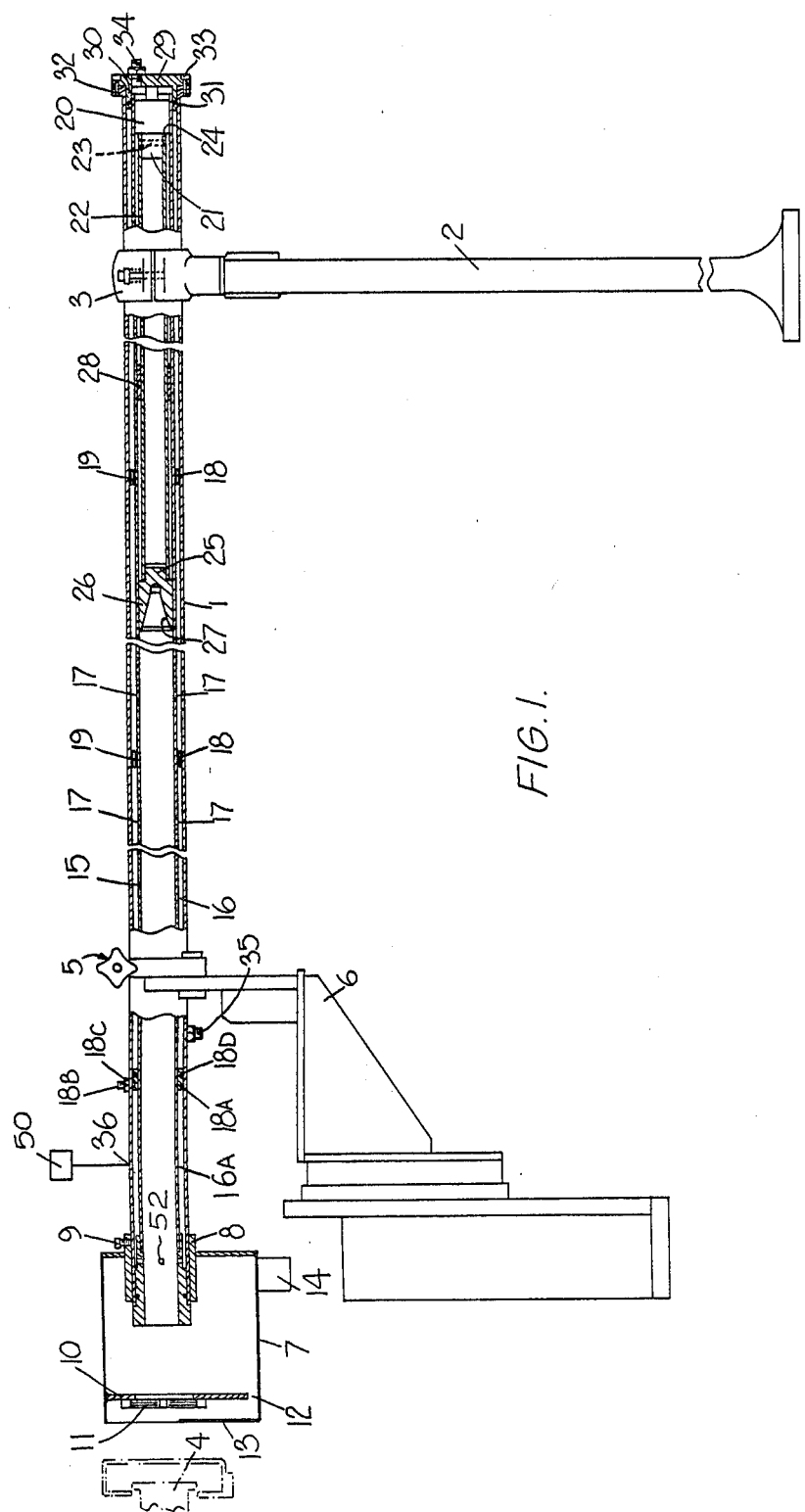

United States Patent [19]

Mason

[11] 4,406,190
[45] Sep. 27, 1983

[54] BAR STOCK FEED APPARATUS FOR A MACHINE TOOL

[75] Inventor: Peter A. Mason, Kenilworth, England

[73] Assignee: White-BSA Tools Limited, Birmingham, England

[21] Appl. No.: 263,311

[22] Filed: May 13, 1981

[30] Foreign Application Priority Data

May 16, 1980 [GB] United Kingdom ............... 8016233

[51] Int. Cl.³ .............................................. B65H 5/16
[52] U.S. Cl. ........................................ 82/2.5; 82/2.7; 82/38 A; 414/17
[58] Field of Search ............... 82/38 R, 38 A, 2.5, 82/2.7; 414/14, 15, 17, 18, 20

[56] References Cited

U.S. PATENT DOCUMENTS 3,945,506   3/1976   Scheurer ............................. 82/2.7
4,034,632   7/1977   Lohner ............................... 82/2.5

FOREIGN PATENT DOCUMENTS 514381    12/1971   Switzerland ......................... 82/2.5
1201904   8/1970    United Kingdom .................... 82/2.5

*Primary Examiner*—Robert E. Garrett
*Assistant Examiner*—Jerry Kearns
*Attorney, Agent, or Firm*—Ladas & Parry

[57] ABSTRACT

A bar stock feed apparatus for a machine tool has a bar stock support tube for alignment, in use with a workpiece carrier of the machine tool. A fluid pressure-actuated feed means in the form of a pusher tube slides within the tube and is driven by a piston to feed the bar when desired. Fluid is introduced into the support tube forwardly of the piston, and independently of the fluid supplied to the piston, to cushion the bar stock within the tube 15 and thereby minimize undesirable noise during operation.

15 Claims, 2 Drawing Figures

BAR STOCK FEED APPARATUS FOR A MACHINE TOOL

This invention relates to a bar stock feed apparatus primarily for use with an automatic turning machine, such as a lathe.

The most commonly used forms of bar feed apparatus include an elongate bar support tube which acts as a magazine for unused bar and usually includes a feed mechanism, such as a pusher movable along the interior of the tube, to feed the bar to a machine tool chuck or collet concentrically aligned with the tube. The bar support tube is usually several feet in length and because the bar stock is normally required to rotate within the support tube, the use of such tubes results in problems of noise and vibration, largely as a result of a "whip" effect which affects the rotating bar, causing it to contact the interior of the tube and thereby produce a loud rattle.

Various attempts have been made to solve this problem, none of which has proved wholly satisfactory, either because of unacceptable complication and attendant inconvenience and expense and/or because they fail to solve the problem completely.

In stock feed apparatus employing a hydraulically operated bar pusher, it has been proposed, for example, to allow oil from the pusher pressure cylinder to enter the bar support tube to cushion the rotating bar against the production of noise. This arrangement usually involves the use of a flow restrictor between the pressure cylinder and bar support tube to control the amount of oil passing to the support tube and since sufficient pressure must be maintained in the cylinder to ensure adequate thrust on the pusher it is necessary to limit the clearance of the bar within the support tube to minimise the amount of oil required for cushioning. One way of doing this has been to provide a plurality of nesting support tubes each with a corresponding pusher device to enable an appropriately sized tube to be selected according to the bar stock to be fed. This arrangement is not only complicated and expensive, but entails the careful storage of any unused tubes and pushers. Moreover, in general, the use of a flow restrictor in the aforesaid manner is inconvenient in that adjustment thereof can necessitate removal of the pusher for access to the restrictor.

An object of the present invention is to provide a bar stock feed apparatus in which the aforesaid disadvantages are alleviated or avoided.

According to the present invention, a bar stock feed apparatus comprises a bar stock support tube intended to be disposed, in use, in alignment with a machine tool workpiece carrier to which bar stock is to be progressively fed, fluid pressure-actuated feed means selectively operable to urge the bar stock towards the workpiece carrier, and means for introducing hydraulic fluid by a route other than said feed means into the support tube at a location forwardly of the feed means in the direction of bar feed to provide a cushioning effect for the bar stock within the tube.

In one convenient arrangement, the support tube is surrounded by a further tube defining a space around the support tube, the hydraulic fluid being fed into said space and introduced into the support tube through one or more openings in the wall of the latter.

Preferably, the fluid pressure-actuated feed means is a piston slidable along the interior of the support tube and conveniently co-operating with a force transmission member, preferably in the form of a pusher device, to urge the bar stock along the tube.

Figure 2:
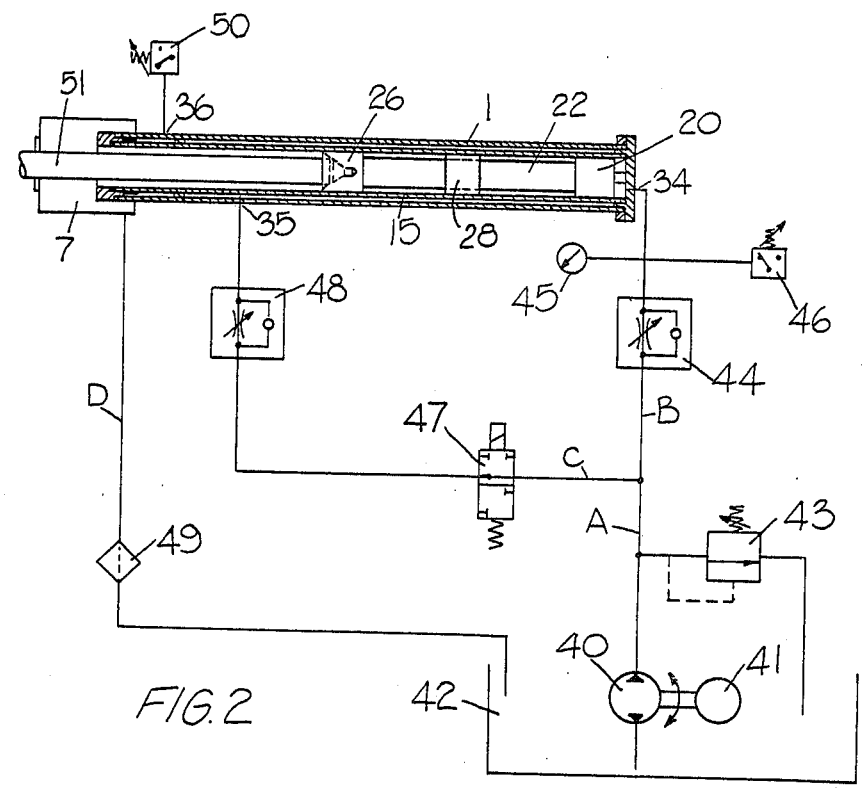

The invention will now be described, by way of example, with reference to the accompanying drawings in which:

FIG. 1 is a side elevation, partly in longitudinal cross-section, of one form of the bar stock feed apparatus of the invention, and FIG. 2 is a diagrammatical representation of a hydraulic fluid supply circuit for use with the apparatus of FIG. 1.

The bar stock feed apparatus shown in FIG. 1 includes an outer tube 1 mounted, in conventional manner, on a support column 2 by way of a pivotal mounting 3 which permits limited pivotal movement of the tube 1 about the vertical axis of the support 2. The tube 1 is normally retained with its longitudinal axis accurately concentric with the rotational axis of a machine spindle, an end portion 4 of which is shown. Such retention is effected by means of a releasable clamping device of conventional type indicated generally at 5, the clamping device being arranged to embrace the tube 1 and being connected to a fixed support 6.

A collector can 7 has a collar 8 fixed within an aperture in the rear face thereof, the collar fitting over the forward end of the tube 1 and being releasably secured by means of a bolt 9 in order to lock the can in position on the tube. The can contains a lid 10 welded around a major portion of the internal peripheral surface of the can and having an aperture formed therein concentric with the tube 1, the aperture being surrounded by a wiper brush 11 secured to the lid 10. The lower portion of the lid 10 is formed with a flat portion so as to leave a gap 12 between that portion of the lid and the wall of the can. The forward open end of the can is partly closed by a D-shaped plate 13, the curved portion of which is shaped to match the curved wall of the can and the flat portion of which extends chordally or diametrically across the mouth of the can. The can is provided with a drain outlet 14 to permit drainage of oil from the can.

Disposed concentrically within the outer tube 1 is an inner bar stock support tube 15 of diameter such as to leave a substantial space 16 between its own external surface and the internal surface of the tube 1. The inner tube is provided at intervals along its length with sets of holed 17 angularly distributed around the tube to provide communication between the space 16 and the interior of the tube 15. The inner tube 15 is supported within the outer tube 1 by annular inserts 18, each of which, with the exception of an insert 18A towards the forward end of the apparatus, is apertured axially at 19 to permit fluid flow therethrough along the space 16. The inner tube is located circumferentially and longitudinally relative to the outer tube by a spigot 18B held in position by a lock nut 18C and engaging the insert 18A itself rigidly secured to the inner tube as by welding for example. A resilient ring 18D provides a resilient mounting for the insert 18A and also serves as a seal defining the end of the space 16. A similar resilient ring surrounds all other annular inserts 18.

Mounted within the inner tube 15 is a piston 20 sized, at least at its central portion, to be a close sliding fit within the inner tube, the rear portion being slightly tapered, if desired, in order to provide a centralising action for the piston.

The piston 20 has a forwardly projecting concentric spigot 21, of smaller diameter than the piston, and this engages within one end of a pusher tube 22 and is retained therein by a pin 23 which passes through the tube wall and spigot, the pin being a tight fit within the spigot but being a loose clearance fit within the tube wall. The end surface of the tube engages against the shoulder 24, formed by the difference in diameter between the larger piston and smaller spigot, and pushing force is applied to the tube 22 via the shoulder 24 and not through the pin 23. The end of the tube remote from the piston 20 is engaged over a spigot 25 extending rearwardly and concentrically from a plug 26 which is a close sliding fit within the inner tube 15 and is provided at its forward end portion with an inwardly tapered recess 27 for the reception, in use, of bar stock. The pusher tube 22 is supported within the inner tube 15, at one or more intermediate locations therealong, by a collar 28 secured, as by welding to the outer surface of the tube and having a diameter such that it is a close sliding fit within the inner tube 15.

The rear end of the outer tube 1 is closed by a plug 29 having an annular boss 30 extending from the inner face thereof and having dimensions such as to be received within the space 16 between the inner and outer tubes and to engage the opposed surfaces of those tubes. A resilient ring 31 forms a seal between the boss 30 and the inner wall of the outer tube and the plug 29 is secured to an annular radially outwardly projecting flange 32 of the outer tube by means of screws 33. The plug 29 is provided with a through passage 34 for the flow of oil into and out of the cylinder formed by the inner tube. Towards the forward end of the apparatus, an oil inlet 35 is provided into the space 16. An oil outlet 36 from the space 16A is also provided for the purpose to be described.

FIG. 2 shows the assembly of the tubes 1 and 15, including the piston 20 and pusher tube 22, connected to a hydraulic supply system. The system is pressurised by means of a pump 40 which is driven by a motor 41, which is reversible to enable the direction of pumping to be changed at will. Alternatively, the pump may be driven via a gear box from a uni-directional motor, the gear box being operable to permit reversal of the pump, when desired. The pump draws oil from a tank 42 and delivers it via an outlet line A, the pump being protected, in conventional manner, by pressure relief valve 43 connected between the line A and the tank 42. The output line is divided into two branches B and C.

The branch C contains a directional valve 47, which may conveniently be solenoid-operated, and when the valve 47 is closed, the branch B directs the pump outlet through the passage 34 into the cylinder formed by the inner tube. A pressure gauge 45 indicates the system pressure which may be regulated by a valve 43. A flow control valve, conveniently of a manually adjustable type, is provided to adjust the bar feed rate. A pressure switch 46 is arranged to operate when the system is pressurised and provide an interlock signal to the main machine control system. When the valve 47 is open, the branch C directs oil from the pump through valve 47, and thence through a flow control valve 48 to the inlet 35, from which the oil flows into the space 16 and thence via holes 17 into the inner tube 15 forwardly of the piston 20 and its associated pusher tube 28. The oil leaving the forward end of the tube 15 passes into the can 7. A return flow line D is provided between the can 7 and the tank 42, a filter 49 being provided in a line D. A further pressure switch 50 is connected to the space 16A which lies forwardly, i.e. remote from the piston 20, of the sealing insert 18A, the pressure switch 50 being actuated during a bar feed cycle for the purpose and in the manner to be described.

A cycle commences with the loading of a length of bar stock, indicated at 51 in FIG. 2, into the feed apparatus. For this purpose, and with the pump 40 inoperative, the clamping device 5 is released to enable the tube assembly to be pivoted about the pivotal mounting 3 until the forward end thereof is sufficiently clear of the machine spindle to enable a length of bar to be inserted through the forward open end of the can and passed along the tube and into the tapered recess 27 of the plug 26 at the forward end of the pusher tube 22. The tube assembly is then swung back to its original position and reclamped by the device 5. The motor 41 is then manually started to drive the pump in the direction such as to deliver a positive oil pressure into the line A. With the valve 47 in the position indicated, the line C provides a flow path of much less resistance than the line B, so that the majority of the pump output flows along the line C and into the space 16 via the inlet 35. Because of the preferential flow through the line C, the pressure applied at this time to the inlet 34 is insufficient to move the piston 20 along the inner tube 15 but adequate to operate switch 46. The oil entering the space 16 flows therealong through the inserts 19 and through the holes 17 into the interior of the inner tube 15, the oil emerging from the inner tube into the interior of the can 7, whence it flows via the return line D to the tank 42. A continual low pressure oil flow is thereby maintained within the inner tube.

In order to feed the bar into the chuck (not shown) of the machine spindle 4, the position of the valve 47 is reversed so that the branch C is effectively blocked and the branch B now provides the only flow path for oil leaving the pump. The result of this is to urge the piston 20 and therewith the pusher tube 22 and plug 26 to the left as seen in the drawings, thereby to push the bar stock 51 through the machine spindle 4 and into the machine chuck, the permitted feed movement of the bar stock being determined by a conveniently positioned bar stop beyond the chuck. A timing device is operative to maintain the valve 47 in its bar feed position for slightly longer than it takes to move the bar against the bar stop, thereby ensuring that the bar is urged hard against the stop until the bar stock has been securely clamped by the chuck.

Alternatively, the arrangement may be such that opening of the chuck initiates operation of the timer to run for a predetermined period, which would again be slightly longer than the duration of the pushing operation. At the end of that time, the chuck would be closed and the directional valve subsequently reversed as aforesaid. Reversal of the directional valve once more supplies oil to the interior of the tube assembly.

When the machine spindle is rotated at normal machining speed, which may be up to 4,000 revs per minute, the bar stock within the tube assembly is rotated at the same speed and with it, by friction of the bar end portion within the recess 27 of the plug 26, the pusher tube 22 is also rotated at approximately spindle speed. The oil flow within the inner tube 15 effectively cushions the rotating bar and avoids, largely or entirely, the usual clattering of the bar within the tube. In practice, it has been found that very smooth and noise-free rotation of all sizes of bar stock within the machine capacity can be achieved simply by adjusting the oil flow by means of the valve 48.

Because of the presence within the gap 16 of the sealing insert 18A, oil is normally precluded from entering that portion 16A of the space 16 which lies forwardly of the insert 18A. A plurality of holes 52 is provided through the wall of the inner tube 15 to provide communication between the interior of that tube and that portion of the space 16 normally isolated by the insert 18A. The holes 52 are conveniently arranged in annular configuration around the inner tube and are normally blocked by the presence of the piston within the inner tube, thereby preventing fluid pressure from reaching the space portion 16A. When the piston has been advanced to a position such that it has moved beyond the holes 52, pressure from the interior of the inner tube 15 is applied to the portion 16A of the space 16 and thence to the pressure switch 50 which operates to reverse the direction of rotation of the pump, in this case by reversing the motor 41, so that a small negative pressure is applied to the interior of the tube 15 behind the piston 20 and has the effect of sucking the piston and pusher tube back along the inner tube to its ititial position at the right hand end of the tube assembly.

It will be understood that the apparatus, of this invention may take a variety of alternative forms. For example, the pump and valves of the hydraulic system may be varied to suit different requirements of manual or automatic operation. In some circumstances, it may be possible to employ a puller mechanism in the apparatus of this invention in place of the pusher mechanism described. The pusher or puller mechanism may be activated hydraulically or pneumatically.

The invention will be seen to provide a simple and efficient bar feed apparatus in which the problems of noise and vibration are minimised and which is capable of receiving a range of bars of different diameters without modification. The particular embodiment described employing the outer tube 1 surrounding the bar support inner tube 15, has the advantage that the tube 1 provides a reservoir of oil to feed the inner tube 15 and thus support the bar stock during the short time during which the oil supply from the pump is directed wholly to the piston 20. The capacity is such that the supply to the reservoir is restored upon completion of the bar feed before fluid flow from it is exhausted. A further advantage is that the oil filled annular space provides a secondary acoustic barrier which further assists to minimise the noise emanating from the bar support tube. It would, however, be possible to dispense with the outer tube and employ an alternative form of reservoir for the aforesaid purpose. It would also be possible to employ separate pressure fluid feed systems respectively for the bar feed and cushioning functions, although a system of the kind described is preferable since it minimises the number of components required and lends itself well to automatic operation.

What is claimed is:

1. A bar stock feed apparatus comprising:
   (a) a bar stock support tube mounted on support means, said tube defining a space for containing bar stock;
   (b) a workpiece carrier deposited at one end of the support tube to receive bar stock;
   (c) fluid pressure actuated feed means which when actuated urge the bar stock along the support tube toward the workpiece carrier;
   (d) a conduit for introducing hydraulic fluid into the support tube at a location forwardly of the feed means in the direction of bar feed; and
   (e) a hydraulic fluid supply system comprising a pump and driving means therefore, and also comprising control means which alternately either permit hydraulic fluid to actuate said fluid pressure actuated feed means, or permit hydraulic fluid to flow into said conduit and hence into said support tube forwardly of said feed means.

2. Apparatus according to claim 1 wherein the support tube is surrounded by a further tube defining said conduit, the hydraulic fluid being fed into said conduit and introduced into the support tube through one or more openings in the wall of the latter.

3. Apparatus according to claim 1 wherein the fluid pressure-actuated feed means is a piston slidable along the interior of the support tube.

4. Apparatus according to claim 2 wherein the fluid pressure-actuated feed means is a piston slidable along the interior of the support tube.

5. Apparatus according to claim 3 wherein the piston is pushed by a force transmission member to urge the bar stock along the tube.

6. Apparatus according to claim 4 wherein the piston is pushed by a force transmission member to urge the bar stock along the tube.

7. Apparatus according to claim 5 wherein the force transmission member is a pusher device.

8. Apparatus according to claim 6 wherein the force transmission member is a pusher device.

9. Apparatus according to claim 3 wherein a rear portion of the piston is inwardly tapered to provide a centralising action for the piston relative to the support tube.

10. Apparatus according to claim 4 wherein a rear portion of the piston is inwardly tapered to provide a centralizing action for the piston relative to the support tube.

11. Apparatus according to claim 2 wherein a forward end portion of the conduit is isolated from the remainder of the conduit and the support tube is apertured to provide communication between said conduit portion and the interior of the support tube, whereby when the piston has moved forwardly past the aperture, fluid behind the piston may enter the tube to actuate a pressure switch for initiating return movement of the piston.

12. Apparatus according to claim 11 wherein said hydraulic fluid supply system comprises a directional valve arranged so that in one of its operational states, it permits oil to be supplied into the support tube forwardly of the feed means and thence to tank, and in another of its operative positions it permits oil to be supplied to the feed means under sufficient pressure to urge the feed means along the support tube to feed bar stock therealong.

13. Apparatus according to claim 12 wherein actuation of the pressure switch reverses the drive means for the pump, thereby creating a negative pressure at the rearward side of the piston to draw the latter back along the support tube.

14. Apparatus according to claim 12 wherein a control valve is disposed between the directional valve and the support tube and is operable to vary the flow of fluid to the support tube.

15. Apparatus according to claim 13 wherein a control valve is disposed between the directional valve and the support tube and is operable to vary the flow of fluid to the support tube.

* * * * *